May 8, 1962 G. K. MULHOLLAND ETAL 3,033,523
VEHICLE FRAME WITH STOWABLE LEVELING JACK ASSEMBLY
Filed April 18, 1960 3 Sheets-Sheet 1
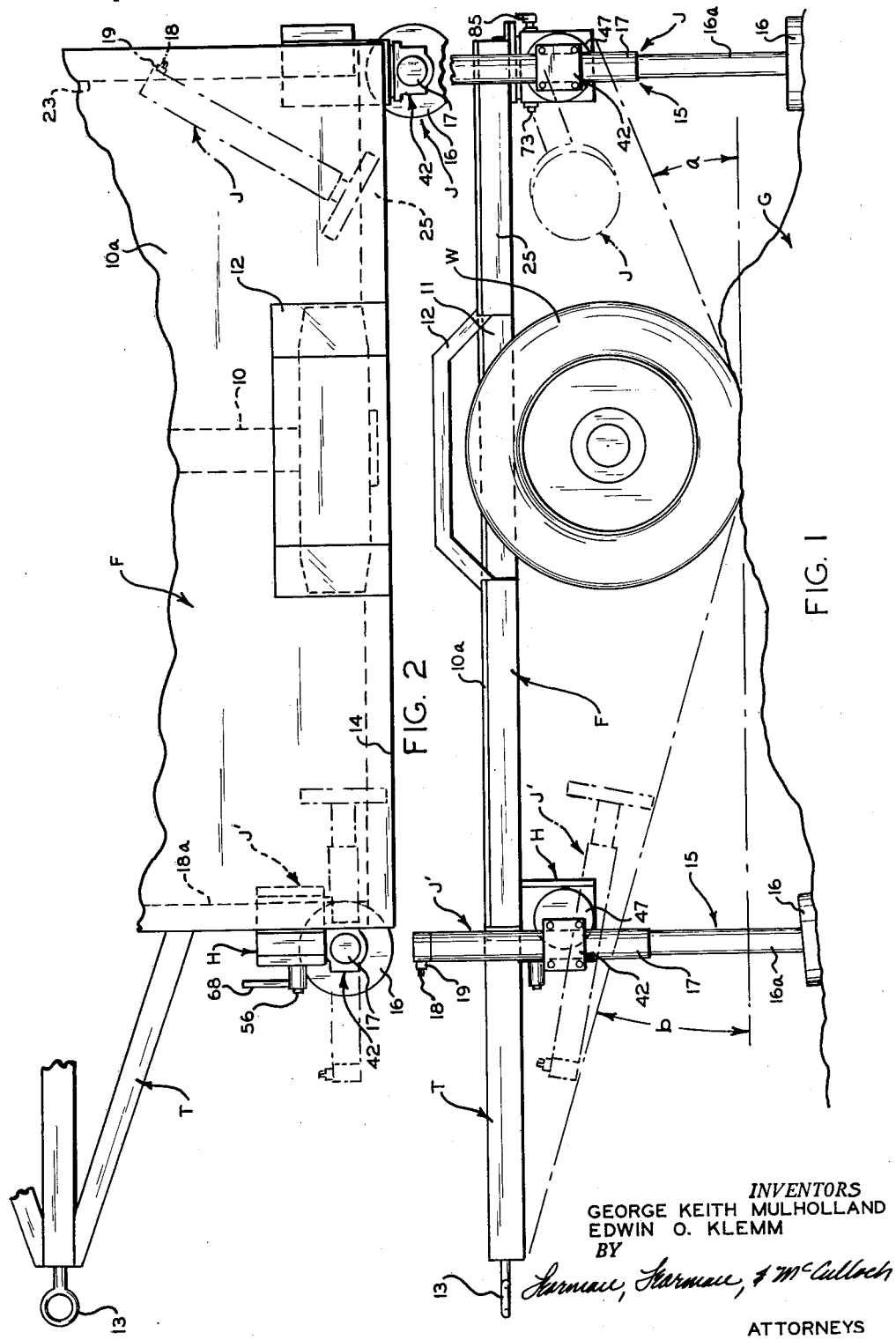
INVENTORS
GEORGE KEITH MULHOLLAND
EDWIN O. KLEMM
BY
ATTORNEYS

INVENTORS
GEORGE KEITH MULHOLLAND
EDWIN O. KLEMM
BY

ATTORNEYS

May 8, 1962 G. K. MULHOLLAND ETAL 3,033,523
VEHICLE FRAME WITH STOWABLE LEVELING JACK ASSEMBLY
Filed April 18, 1960 3 Sheets-Sheet 3

*INVENTORS*
GEORGE KEITH MULHOLLAND
EDWIN O. KLEMM
BY

ATTORNEYS

United States Patent Office 3,033,523
Patented May 8, 1962

3,033,523
VEHICLE FRAME WITH STOWABLE LEVELING
JACK ASSEMBLY
George Keith Mulholland and Edwin O. Klemm, Saginaw, Mich., assignors to Saginaw Products Corporation, Saginaw, Mich., a corporation of Michigan
Filed Apr. 18, 1960, Ser. No. 23,045
14 Claims. (Cl. 254—86)

This invention relates to vehicle frames incorporating stowable leveling jack assemblies which are movable from a vertically operative, vehicle stabilizing position to a folded position beneath the vehicle frame for transit of the vehicle and the equipment which it transports from one location to another.

The invention to be described in detail is particularly suited to two-wheel trailers of a type which are often drawn by jeep and carry relatively complex and delicate electronic equipment which must be stabilized and level when in use. For instance, two-wheel trailers bearing radar equipment including antenna members are often towed to positions in rough terrain and in order to place the apparatus in condition for operation it is then necessary to level the vehicle frame on the uneven terrain. It is also necessary to maintain it in stabilized position to prevent vibration of the antenna members and other parts during operation of the radar units. The leveling jack assemblies which are employed to stabilize and level the vehicle frame must, according to specification, be readily retractable to a stowed position in which they do not project from the sides of the vehicle frame and are disposed above certain angles of approach and departure with relation to the vehicle wheels when it is desired to move the vehicle.

One of the prime objects of the present invention is to provide an integrated leveling jack and vehicle frame assembly in which the jack assemblies, when not in use, can very easily and simply be manually swung to a stowed position, and locked in such position underneath the body of the trailer above allowable angles of departure and approach so that such vehicles are not restricted in their movement over rough terrain.

Another object of the invention is to provide a construction of this type in which the jack unit is balanced for easy swiveling by being supported substantially intermediate its ends, with manipulation being facilitated by balancing the extending upper portion of the jack unit with the lower portion thereof during the swiveling operation.

A further object of the invention is to provide a construction of the character described in which the stowable leveling jack assemblies can be readily swung upwardly from vertical position and thence inwardly to a position diagonally under a corner of the vehicle frame.

A further important object of the invention is to provide an assembly of the character described having a closed housing member which mounts the jack on the vehicle frame and houses detent engaged plate members and easily released detents which, when in locked position, hold jack units of the character described in stowed position.

It is another object of the invention to provide handle released locking members, for holding such a leveling jack assembly in both stowed and vehicle leveling position, within a housing which protects the operable parts from the entry of dirt and foreign matter which would interfere with the operation of the jack units at a time when their inoperability would have grave consequences.

Another object of the invention is to provide assemblies of the character described wherein many of the parts are interchangeable in the sense that they can be used on either side of the vehicle so that large numbers of different spare parts need not be warehoused.

A still further object of the invention is to provide a construction of the character described which is highly reliable and durable, and can be economically manufactured and assembled.

Other objects and advantages of the invention will be pointed out specifically or will become apparent from the following description when it is considered in conjunction with the appended claims and the accompanying drawings, in which:

FIGURE 1 is a side elevational view with the diagrammatic lines indicating stowed positions of the jack assemblies shown;

FIGURE 2 is a fragmentary, top plan view thereof with diagrammatic lines similarly illustrating the stowed positions of the jack assemblies under the vehicle frame;

Figure 3:
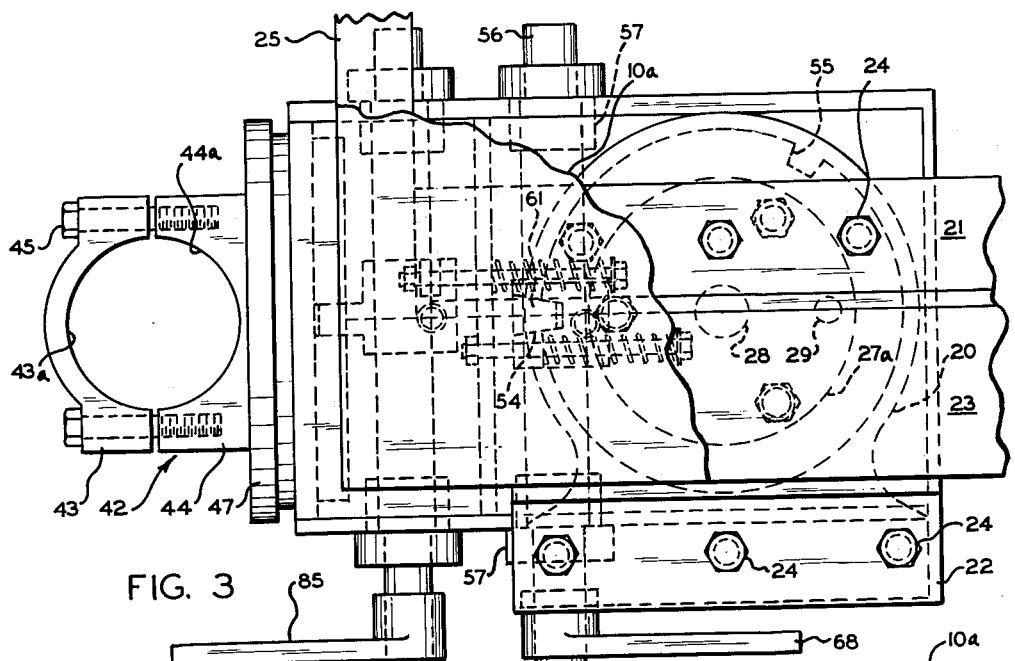
FIGURE 3 is an enlarged, top plan view of the jack assembly shown on the rear end of the vehicle in FIGURES 1 and 2 with the jack unit being shown in operative position outward of the vehicle frame.

Referring now more particularly to the accompanying drawings for a detailed description of the invention, a rectangularly shaped vehicle frame generally designated F is mounted on a pair of wheels W as shown, the wheels W being journaled on opposite ends of an axle 10 in the usual manner and mounting a conventional suspension system (not shown) which supports the frame F. For purposes of convenience of illustration, the frame F is shown as comprising a plate-like member 10a mounted on frame members to be later identified which provide a wheel well 11 permitting the upper end of the wheel to extend upwardly of the frame F. However, it is to be understood that the frame F could for some purposes consist of simply an open framework of structural members. In both cases, guard members 12 are welded to the frame F above the wheels W.

In FIGURE 2, only one side of the vehicle or trailer is illustrated in plan. However, it is to be understood that identical parts appear on the opposite side of the trailer and accordingly it will be unnecessary to illustrate the opposite side. In FIGURES 1 and 2 a jack assembly generally designated J is shown at the rear of the trailer frame and a jack assembly generally designated J' at the front end thereof. A jack assembly J (not shown) also appears at the opposite rear corner of the frame F and a jack assembly J' (not shown) at the opposite front corner, of course. Also, a retractable landing gear unit may be provided on the front end of the tongue T of the trailer which is welded to the frame F and includes the usual hitch ring 13 by means of which the trailer is attached to the motive vehicle when desired. In FIGURE 1 the trailer is shown demounted from the motive vehicle and stabilized in level position by the jack assemblies J and J' on rather uneven terrain which is indicated at G.

Both the jack assemblies J and J' shown must, when in stowed position, be inward of the side edges 14 of the vehicle, according to specification, but whereas it is permissible for the jack assembly J' to extend forwardly of the frame, as shown in FIGURES 1 and 2, during transit of the vehicle, it is not permissible for the jack assembly J to extend rearwardly of the frame F. The problem therefore arises of providing a jack incorporating vehicle frame construction in which the jack is outward of the side edge 14 of the vehicle frame when it is in vertical position, but is above the predetermined departure angle "a" and does not extend rearwardly of the frame F when moved to stowed position. The invention is acordingly directed to the assembly generally designated J as it is mounted or incorporated with the frame F to swing from a vertical position outward of the side of the vehicle frame to a horizontally tilted position completely underneath the corner of the vehicle frame.

The jack assembly includes a conventional jack unit generally designated 15 which has a base plate 16 connected to an inner sleeve member 16a. An outer sleeve member 17 is also shown, and these parts operate in the same manner as illustrated in applicants' assignee's copending application Serial No. 793,594. In lieu of a handle projecting from the outer sleeve member 17, an operating shaft with a hexagonally shaped terminal end 18 projects from a bearing portion 19 on the upper end of the outer sleeve 17 and can be engaged by a suitable socket head wrench or the like for withdrawing and retracting the inner sleeve 16a of the conventional jack as desired in the usual manner to raise or lower the rear end of the frame F to which the jack assembly J is secured until the leveling device on the trailer indicates that the frame F is truly level.

The jack unit 15 is mounted for multiple swiveling movements to the stowed position in which it is shown in diagrammatic lines in FIGURES 1 and 2, in a manner to be now described. A plate member 20 is secured to the frame F in any acceptable manner, as by employing angles 21 and 22 which are secured to the frame rear rail member 23 with bolts 24. The angles 21 and 22 may or may not also be welded to the rear side rail member 25.

Fixed to the underside of the plate 20 by bolts 26 is a horizontally disposed bearing plate 27 which is located in position by means of a central dowel pin 28 and a dowel pin 29. The bearing plate 27 includes a reduced neck portion 27a on which a closed housing generally designated H is swivelably mounted. The housing H includes side walls 30, a bottom wall 31, rear wall 32, front wall 33, and a top wall 34 with an opening 35 of a diameter to provide only adequate clearance for relative rotation of the housing H with respect to the reduced portion 27a of the bearing plate 27.

Provided on the top wall 34 is an annular flange portion 36 which extends into an annular groove 37 provided in the underside of the mounting plate 20 and it will be seen that friction rings 38 and 39, which are preferably formed of brass, are sandwiched between the mounting plate 20 and the top wall 34 inwardly of the flange 36 and between the top wall 34 and the enlarged head of the bearing plate 27. The function of rings 38 and 39 is to prevent the entry of moisture and consequent rusting of the parts, and also to exclude dirt and foreign material from the interior of the housing H. This is also the reason for providing the upstanding flange 36 within groove 37 and these parts tend to discourage the entry of mud or the like.

Mounted by the front wall 33 of the housing H is an identical bearing plate 40 which includes a reduced neck portion 40a received within the opening 41 in the wall 33 with sufficient clearance only to provide for unrestricted rotation of the neck portion 40a of the plate 40 therein. The plate 40 mounts a jack clamping bracket generally designated 42 which includes an outer part 43 and an inner part 44 connected by clamp screws 45. Each of the inner and outer parts 43 and 44 include socket surfaces 43a and 44a, respectively, configured to accommodate the outer housing 17 of the jack unit 15 between them and the clamp screws 45 are tightened down so that the jack unit J is securely clamped in fixed position by the clamp bracket 42. Bolts 46 are provided to secure the bearing plate 40 to the base flange 47 of the clamping bracket 42 and dowel pins 48 and 49 are provided to locate the bracket 42 with respect to the bearing plate 40. The bearing plate 40 has a projecting annular flange 50 received within the annular groove 51 in the base flange 47 of the clamping bracket 42 to prevent the entry of mud to the relatively rotating surfaces and inner and outer brass ring members 52 and 53 are provided as before to prevent the entry of moisture, dust, and the like to the interior of the housing H.

As shown in FIGURE 3, the bearing plate 27 has a pair of peripherally spaced notches 54 and 55 provided with divergent side walls and a shaft 56 mounted in bearings 57 journaled by the housing H has a detent member generally designated 58 mounted thereon in a position to engage with one of the notches 54 or 55 in the stationary plate 27. The detent member includes a bifurcated block with legs 59, as illustrated, which are clamped on the shaft 56 by means of the clamp bolt 60. The detent blade 61 has convergent sides matching the sides of the notches 54 and 55 so as to be readily received therein and, because of this taper of the notches 54 and 55 and member 61, the tolerances of the parts need not be exact and wear of the parts will not affect the operation of the detent 61, since the only result of wear will be to better seat the detent 61 within the notches 54 and 55.

It will be seen that a dependent wall or plate 62 is provided within the housing H and mounted thereon is a bolt member 63, secured by a nut 64, which receives a spring 65, as shown. The spring 65 is in a state of compression and operates to urge the arm 66 of the detent member 58 in a direction to seat the detent blade 61 within one of the notches 54 or 55, the arm 66 having an opening 67 through which the bolt member 63 freely passes.

Figure 5:
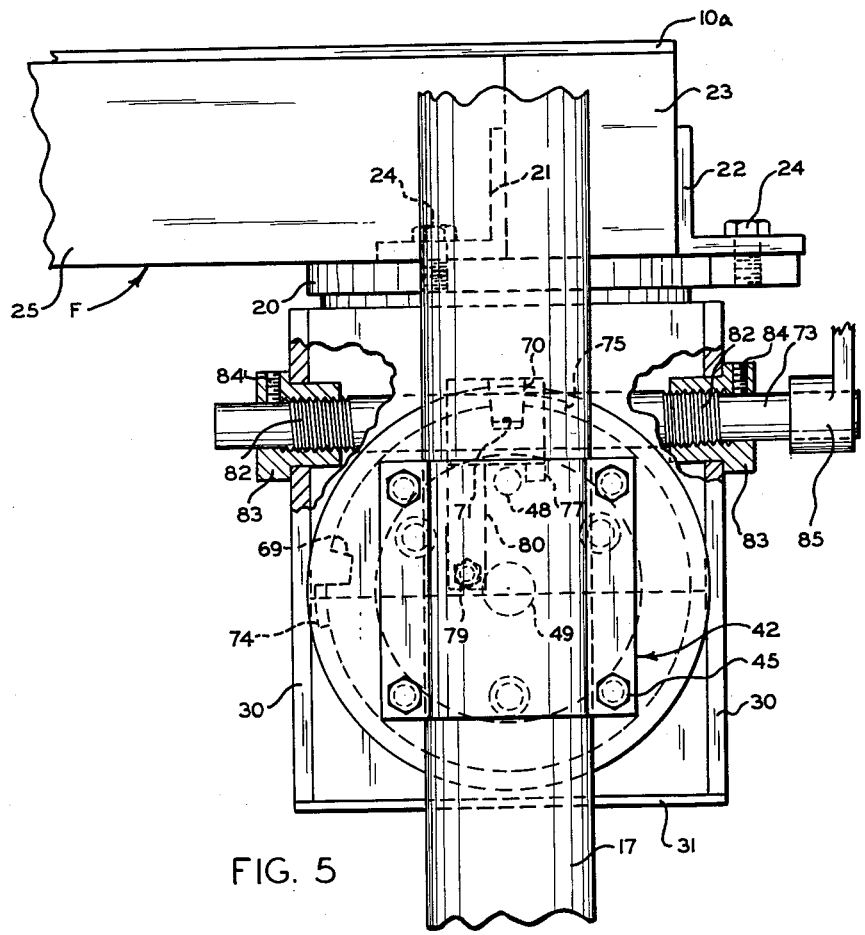
FIGURE 5 is a similar, partly sectional, side elevational view.

Fixed on the rear end of the shaft 56, which extends longitudinally of the vehicle frame F and projects beyond the rear edge thereof, is a handle 68 which can be fixed to the shaft 56 by means of set screws or the like so that when it is desired to release the detent blade 61 it is only necessary to manipulate handle 68. The rotary bearing plate 40 is similarly provided with notches 69 and 70 (FIGURE 5) which also have divergent side walls, as shown, to receive the blade 71 of a detent member generally designated 72 mounted on a shaft 73 which is substantially parallel with shaft 56. The blade 71 similarly has convergent side walls to facilitate its entry into the notches 69 and 70 and it will be seen that stops 74 and 75 (FIGURE 5) are provided on the peripheral wall of the head portion of the bearing plate 40 adjacent the notches 69 and 70, respectively, to insure that the bearing plate 40 is prevented from rotation past the notches. The detent member 72 similarly is bifurcated and its legs 76 are clamped in adjusted position on the shaft 73 by the clamp screw 77. A bolt 78 secured by a nut 79 to an arm 80 extending from the detent member 72 passes freely through an opening 81 in the interior wall 62 of the housing H and mounts a spring 82 which is in a state of compression and normally urges the detent blade 71 in a direction toward the adjacent notch 69 or 70.

The shaft 73 includes the threaded portions 82 and is secured with relation to the threaded bearings 83 by means of set screws 84. It is to be understood that the bearings 83 rotate with relation to the side walls 30 of the housing H. A handle 85 extending oppositely from the handle 68 is fixed to the rear end of shaft 73 by means of set screws or the like and can be manipulated to rotate shaft 73 and lift blade 71 from the notches 69 or 70 when it is desired to change the position of the jack unit 15 by rotating bearing plate 40.

The shaft 56 has similar threaded portions 82 which permit its ready adjustment axially with respect to identical threaded bearings 57, and similar set screws 84 prevent relative rotation of the bearings 57 and shaft 56. The bearings 57 rotate similarly in the side walls 30 of the housing H.

Figure 4:
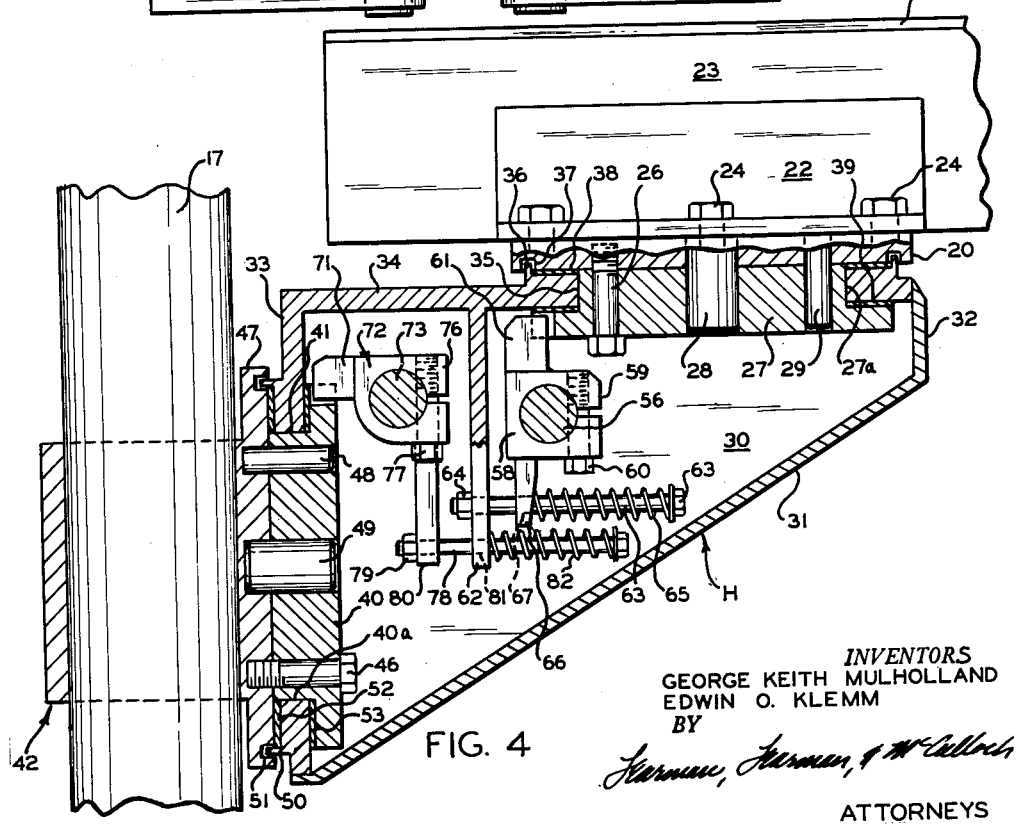
FIGURE 4 is a similar, transverse, sectional, rear elevational view.

In operation, the jack assembly J is carried in the stowed position indicated by the diagrammatic lines in FIGURES 1 and 2 when the trailer is in transit and, because the jack assembly in this position lies above the angle of departure "a" which is specified, movement of the trailer is not restricted by the terrain on which the vehicle may be required to operate. When the vehicle is stopped, the jack assembly J can be quickly moved to operative position. Handle 68 is first swung counter-clockwisely (FIGURES 3 and 4) to remove blade 61 from the notch 55 in the mounting plate and housing H is thence swung outwardly about the bearing plate neck 27a until, with handle 68 released, the mounting blade 61 engages within the notch 54. It will be seen that the notches 54 and 55 are spaced slightly more than 90° apart and their position is predetermined such that the jack is swung outwardly from a diagonal position with respect to the corner of the vehicle frame in which the housing H and jack unit 15 are completely under the vehicle frame to a position in which the rotary bearing plate 40 is longitudinally aligned with the side beam 25 of the vehicle frame F. In this position the housing H projects slightly beyond the side edge 14 of the vehicle frame F so that there is adequate clearance for the jack unit J which must be rotated to extend above the frame top plate 10a.

The handle 85 is then moved in a clockwise direction (FIGURES 3 and 4) to remove the blade 71 from the notch 69 and the jack unit 15 is then swung through substantially 90° until the blade 71 strikes the stop plate 75 whence it is allowed to engage within the notch 70. In this position the jack unit 15 is in upright position and, upon rotation of the hexagonally projecting shaft 18, the inner sleeve 16a is lowered the desired amount. The return of the jack assembly J to stowed position is accomplished in just the reverse manner by first releasing detent blade 71 and rotating bearing plate 40, and thence releasing detent blade 61 and rotating housing H.

It will be observed that the unit is designed such that many of the parts are interchangeable; for instance, the plates 27 and 40, the rings 38, 39, 52, and 53, the shafts 56 and 73, and dowels 28 and 49, and 29 and 48, to mention a few. These parts, of course, also are provided on the jack assembly J (not shown) at the opposite rear corner of the vehicle frame.

It is also important to note that the detent members 58 and 72 can be adjusted to desired position along each of the shafts 56 or 73 to exactly locate the proper places for them and then can be later adjusted for wear of the parts.

The jack unit J' is an adaptation of the jack unit J, which in stowed position must lie above the approach angle "b" according to specification. In this instance it will be noted that the shaft 56 projects forwardly of the trailer frame F so that the handle 69 is readily accessible. In this version of the jack assembly, the clamping bracket 42 is offset with relation to its flange 47 and the housing H is fixed to the front vehicle frame member 18a. The construction of the jack unit J' need not further be described since it is identical with the construction of the jack assembly J except that the top wall of the housing is closed and directly bolted to the frame F, and the bearing plate 27, shaft 56, detent 58, bolt 63, and spring 65 are omitted. The purpose of illustrating the jack assembly J' is to show how the vehicle frame F is at the same time stably supported at its front end on the uneven terrain. With a pair of rear jack assemblies J and front jack assemblies J', and the usual tongue T landing gear (not shown), a five point stabilizing system is provided for the wheels W.

In view of the foregoing, it should be apparent that we have perfected a frame incorporated jack assembly of considerable versatility which will find wide use in the field for which it was designed.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. The combination with a vehicle frame supported above the ground on ground engaging wheels intermediate the ends thereof of a substantially closed, box-like housing mounted under said frame at a rear corner thereof for swiveling movements in a generally horizontal plane; a generally horizontally disposed member within said housing fixed on said frame and having circumferentially spaced, detent engaging surfaces thereon; a first detent within said housing and mounted thereby to swivel therewith adjacent said member movable to and from releasable locking engagement with the said surfaces of said member; an extensible, stowable jack mounted on a side of said housing for swiveling movements in a generally vertical plane to and from a vertical position and a raised position above a plane extending generally from the lower rear end of the housing to the lower surface of the wheels thereof; a generally vertically disposed plate member in said housing fixed for swiveling movements with said jack and having circumferentially spaced, detent engaging surfaces thereon; a second detent within said housing and mounted thereby to swivel therewith adjacent said vertically disposed plate member movable to and from releasable locking engagement with the said surfaces of the vertically disposed plate member; and means connecting with said detents for operating them, extending outside said housing; disengagement of said second detent with said detent engaging surfaces on said generally horizontal member allowing swinging of said housing inwardly to dispose said jack under said frame generally diagonally across said corner of the frame.

2. The combination with a vehicle frame supported above the ground on ground engaging wheels or the like of; a substantially closed housing mounted under said frame for swiveling movements in a generally horizontal plane; a generally horizontally disposed plate member within said housing fixed on said frame and having circumferentially spaced, detent engaging surfaces thereon; a detent within said housing and mounted thereby to swivel therewith adjacent said plate member movable to and from releasable locking engagement with the said surfaces of said plate member; an extensible, stowable jack mounted on a side of said housing for swiveling movements in a generally vertical plane; a generally vertically disposed plate member in said housing fixed for swiveling movements with said jack and having circumferentially spaced, detent engaging surfaces thereon; a second detent within said housing and mounted thereby to swivel therewith adjacent said vertically disposed plate member movable to and from releasable locking engagement with the said surfaces of the vertically disposed plate member; and means connecting with said detents for operating them, extending outside said housing.

3. The combination with a vehicle frame supported above the ground on ground engaging wheels of; a generally horizontally disposed mounting plate fixed on the underside of said frame; a substantially closed, box-like housing having a top wall mounted under said frame on said plate for swiveling movements in a generally horizontal plane; said mounting plate having an annular groove in the underface thereof and said housing having a flange extending up into said groove; a generally horizontally disposed plate member within said housing fixed on said frame and having circumferentially spaced, detent engaging surfaces thereon; a detent within said housing and mounted thereby to swivel therewith adjacent said plate member movable to and from releasable locking engagement with the said surfaces of said plate member; a jack supporting bracket having a base plate journaled on a side of said housing; an extensible, stowable jack mounted on said plate and having swiveling movements therewith in a generally vertical plane relative to said housing; said base plate having an annular groove in the face thereof adjacent said side of the housing, and said side of the housing having a flange extending into said groove; a generally vertically disposed plate member in said housing fixed for swiveling movements with said jack and having circumferentially spaced, detent engaging surfaces thereon; a second detent within said housing and mounted thereby to swivel therewith adjacent said vertically disposed plate member movable to and from releasable locking engagement with the said surfaces of the vertically disposed plate member; and means connecting with said detents for operating them, extending outside said housing.

4. The combination defined in claim 3 in which friction rings are provided between said mounting plate and the top wall of the housing and between said top wall of the housing and generally horizontally disposed plate member.

5. The combination defined in claim 3 in which friction rings are provided between said base plate and side wall of the housing and between said side of the housing and generally vertically disposed member.

6. A jack assembly for a vehicle frame supported above the ground on ground engaging wheels comprising; a substantially closed, box-like housing mounted under said frame for swiveling movements in a generally horizontal plane; a generally horizontally disposed plate member within said housing fixed on said frame and having circumferentially spaced, detent notches in the peripheral edge thereof; a shaft journaled by said housing; a detent fixed on said shaft within the housing to swivel with said housing adjacent said plate member and swingable to and from releasable locking engagement with the said notches in said plate member; an extensible, stowable jack mounted on a side of said housing for swiveling movements in a generally vertical plane; a generally vertically disposed plate member in said housing fixed for swiveling movements with said jack and having circumferentially spaced notches in the peripheral edge thereof; a second shaft parallel to said first shaft journaled by said housing; a second detent fixed on said second shaft within said housing to thereby swivel with said housing adjacent said vertically disposed plate member and swingable to and from releasable locking engagement with the said notches in the vertically disposed plate member; levers fixed on said shafts outside said housing for operating said detents; a plate fixed to said housing extending between said shafts; and spring means mounted thereby and connected with the detent members for normally urging the latter toward locked position in selected notches in said plate members.

7. A swivelable jack assembly for fixing to the underside of a vehicle frame or the like comprising; a substantially closed housing; an extensible, stowable jack mounted on a side wall thereof for swinging movements in a generally vertical plane to and from a ground engaging position and a stowed position; a generally vertically disposed plate member within said housing opposite said jack having circumferentially spaced apart detent engaging surfaces; a member connecting said jack and plate member and supported by the said side of the housing; a shaft supported within said housing extending generally adjacent said plate member and extending outside said housing; a detent fixed on said shaft for movement to and from releasable engagement with said detent engaging surfaces; and a handle outside said housing on said shaft for rotating said shaft and operating said detent.

8. A swivelable leveling jack assembly fixed to the underside of a vehicle frame supported above the ground on ground engaging wheels comprising; a substantially closed, box-like housing mounted on the underside of said frame; an extensible, stowable jack mounted on a side wall thereof for swinging movements in a generally vertical plane to and from a ground engaging position and a stowed position folded toward the frame; a generally vertically disposed plate member within said housing opposite said jack having circumferentially spaced apart, peripheral notches therein; a member connecting said jack and plate member pivotally supported by the said side of the housing; a rotatable shaft supported within said housing extending generally adjacent said plate member and extending outside said housing; a detent fixed on said shaft for swinging movement to and from releasable engagement with one of said notches; a plate mounted within said housing; spring means carried by said bracket and engaging an end of said detent for normally urging said detent into locked engagement within one of the notches in said plate member; and a handle outside said housing extending radially from said shaft for operating said detent.

9. A swivelable leveling jack assembly for fixing to the underside of a vehicle frame or the like comprising; a substantially closed, box-like housing; an extensible, stowable jack mounted on a side wall thereof for swinging movements in a generally vertical plane to and from a ground engaging position and a stowed position folded toward the frame; a generally vertically disposed plate member within said housing opposite said jack having circumferentially spaced apart detent engaging surfaces; a member connecting said jack and plate member pivotally supported by the said side of the housing; friction rings surrounding said latter member interposed between said side wall of the housing and jak, and between said side wall of the housing and vertically disposed plate member; a shaft supported within said housing extending generally adjacent said plate member and extending outside said housing; a detent fixed on said shaft for movement to and from releasable engagement with said detent engaging surfaces; and a handle outside said housing on said shaft for operating said detent.

10. A swivelable leveling jack assembly fixed to the underside of a vehicle frame supported above the ground on ground engaging wheels comprising; a substantially closed, box-like housing mounted on the underside of said frame; a jack clamp bracket including a base plate mounted on a side wall of said housing for swinging movements in a generally vertical plane, said clamp bracket mounting a jack to move with said bracket to and from a ground engaging position and a stowed position folded toward the frame; a generally vertically disposed plate member within said housing opposite said jack having circumferentially spaced apart detent engaging surfaces; a member connecting said jack and plate member pivotally supported by the said side of the housing; said base plate of the clamp bracket having an annular groove in the side thereof adjacent said side wall of the housing and the side wall of the housing having a flange extending into said groove but cleared therefrom to permit relative rotation of the said base plate and flange without interference; a shaft supported within said housing extending generally adjacent said plate member and extending outside said housing; a detent fixed on said shaft for movement to and from releasable engagement with said detent engaging surfaces; and a handle outside said housing on said shaft for operating said detent.

11. A swivelable jack assembly fixed to the underside of a wheel supported vehicle frame and comprising; a substantially closed housing; an extensible, stowable jack mounted on a side wall thereof for swinging movements in a generally vertical plane to and from a ground engaging position and a stowed position underneath the frame; a generally vertically disposed plate member within said housing opposite said jack having circumferentially spaced apart detent engaging surfaces; a member connecting said jack and plate member pivotally supported by the said side of the housing; a shaft supported within said housing extending generally adjacent said plate member and extending outside said housing; a bifurcated detent having legs embracing said shaft; clamp screw means releasably clamping said legs for holding said detent on said shaft in adjusted fixed position relative to said detent engaging surfaces for movement to and from releasable engagement therewith; and a handle outside said housing on said shaft for operating said detent.

12. A swivelable jack assembly fixed to the underside of a wheel supported vehicle frame comprising; a substantially closed housing; an extensible, stowable jack mounted on a side wall thereof for swinging movements in a generally vertical plane to and from a ground engaging position and a stowed position underneath the frame; a generally vertically disposed plate member within said housing opposite said jack having circumferentially spaced apart detent engaging surfaces; a member connecting said jack and plate member pivotally supported by the said side of the housing; a shaft having threaded portions at the ends thereof extending generally adjacent said plate member and projecting outside said housing; bearings for supporting said shaft rotatably received by said housing and having threaded engagement with the threaded portions of said shaft; releasable means normally preventing axial movement of said shaft in said bearings; a detent fixed on said shaft for movement to and from releasable engagement with said detent engaging surfaces; and a handle outside said housing on said shaft for operating said detent.

13. The combination defined in claim 12 in which spring means operating between said housing and detent normally urge said detent toward engagement with said detent engaging surfaces.

14. The combination with a vehicle frame supported above the ground on ground engaging wheels or the like near a corner of the frame: a housing mounted under said frame for swiveling movements in a generally horizontal plane from an "in" to an "out" position; an extensible, stowable jack mounted between its ends on a side of said housing for swiveling movements in a generally vertical plane generally parallel to said wheels from a generally horizontal position to a vertical position, said jack in "out" position being disposed out from under said frame so that when swung to vertical position it can extend above said frame; said housing being swivelable through an arc swinging said jack, when in generally horizontal position, from "in" position generally diagonal of the corner of the frame and under said frame, to the said position "out" from under said frame; and operable means for securing the jack in said positions.

References Cited in the file of this patent
UNITED STATES PATENTS

| | | |
|---|---|---|
| 2,436,799 | Frost | Mar. 2, 1948 |
| 2,555,336 | Hagely | June 5, 1951 |
| 2,650,055 | Perkins | Aug. 25, 1953 |
| 2,734,726 | Gebhart | Feb. 14, 1956 |